Aug. 21, 1928.
F. F. BRAND
PROTECTIVE APPARATUS
Filed June 9, 1926
1,681,514
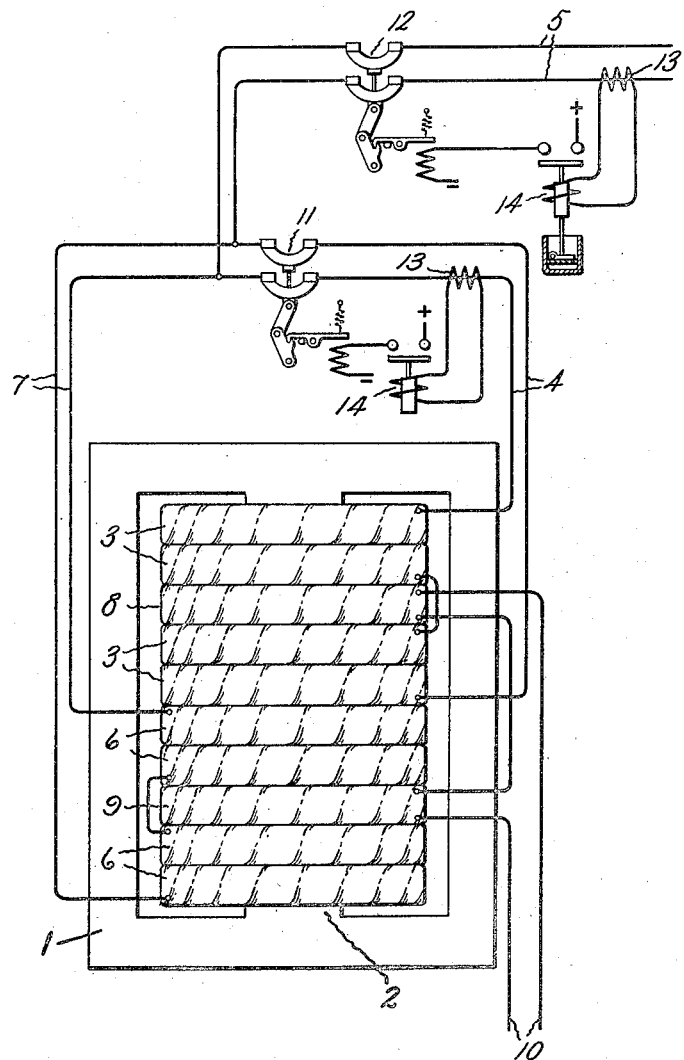
Inventor:
Frederick F. Brand,
by
His Attorney.

Patented Aug. 21, 1928.

1,681,514

UNITED STATES PATENT OFFICE.

FREDERICK F. BRAND, OF PITTSFIELD, MASSACHUSETTS, ASSIGNOR TO GENERAL ELECTRIC COMPANY, A CORPORATION OF NEW YORK.

PROTECTIVE APPARATUS.

Application filed June 9, 1926. Serial No. 114,814.

My invention relates to protective apparatus and more particularly to an improved construction and arrangement of electrical apparatus winding with circuit breakers adapted to interrupt a load on the apparatus in case it reaches some predetermined excessive value as may happen in case of a short circuit or ground. In connection with large transmission and distribution systems, it is sometimes desirable or necessary to use electrical apparatus such as generators and transformers of extremely large capacity, and the use of such extreme sizes of apparatus is increasing. An accidental short circuit or ground on a line supplied with current from such apparatus will subject the apparatus to a heavy overload which may reach a valve of twenty or more times its rated capacity and this heavy flow of energy must be promptly reduced or interrupted to prevent injury to the apparatus. The size and cost of protective apparatus for this purpose is therefore determined more by the amount of energy which it must control under short circuit conditions than by the normal rating of the apparatus which it protects. A circuit breaker of sufficient size is not only very costly but one that is safe and reliable is difficult to design and construct. The general object of the invention is to provide an improved arrangement of electrical winding with protective apparatus particularly adapted to provide protection in systems of large capacity. In accomplishing this result, the winding is formed in a plurality of sections which are normally connected in parallel and circuit breakers are arranged to disconnect these winding sections one after the other and preferably in predetermined sequence when the load on the apparatus reaches a predetermined excessive value. The winding sections are arranged so that the disconnection of each section causes a substantial increase in impedance with a corresponding decrease in the load. By thus reducing the load in steps, the maximum size of circuit breaker necessary is reduced.

The invention will be better understood from the following description taken in connection with the accompanying drawing which shows one arrangement of the invention as it may be applied in connection with a transformer.

The transformer comprises a magnetic core 1 having a central winding leg 2 surrounded by the windings which are of the interleaved disc type. One of the windings is formed in a plurality of parallel connected sections, two such sections being shown in the drawing as this number of sections is usually sufficient. One of these winding sections comprises the coils 3 which are connected by the conductors 4 to the outside circuit 5. The other winding section comprises the coils 6 which are connected by the conductors 7 to the outside circuit 5. The two sections are thus connected to operate in parallel. The other winding comprises two sections 8 and 9 which are connected in series to the outside circuit 10.

The winding section 8 is closely coupled with the coils 3 and the section 9 is closely coupled with the coils 6. Each winding is therefore closely coupled with the other as a whole so that the normal reactance of the transformer may be of low value. The two parallel connected winding sections are, however, inductively related in the apparatus in such manner that, if either of them is disconnected and its turns become inactive, the impedance of the transformer will be substantially increased. A fault in the system such as an accidental short circuit or ground may cause a sudden and very large increase in the transformer load which must be promptly reduced or interrupted to prevent injury to the transformer as well as to other apparatus in the system. Such a load might be so large that a single satisfactory and reliable circuit breaker capable of controlling it would be very costly and difficult to design and construct. The invention provides automatic circuit breaking means which, with the parallel connected winding sections already described, avoids the necessity for a circuit breaker of extreme size and capacity.

A circuit breaker 11 in the conductors 4 is arranged to disconnect the coils 3 of one of the parallel connected winding sections and a second circuit breaker 12 is arranged to disconnect the other parallel connected winding section comprising the coils 6 after the first circuit breaker 11 has been opened. When a heavy overload occurs for any reason, the heavy load current will act through the current transformers 13 and relays 14 to trip and open the two circuit breakers, but the relay 14 of the circuit breaker 12 is set to operate slower or with a longer time delay than the relay of the circuit breaker 11. Thus the circuit breaker 11 will always disconnect the coils 3 before the other circuit breaker 12 can disconnect the coils 6. There is high reactance, however, between the coils 6 and the coil 8 of the other winding so that the impedance of the transformer is substantially increased and the load correspondingly reduced as soon as the coils 3 are disconnected. The circuit breaker 12 then has only this reduced load to interrupt and therefore need not be of extreme size and capacity.

The circuit breaker 12, which is the last one to open, has been shown and described as being connected in the conductors 5 of the main circuit instead of in the conductors 7 of the last parallel connected winding section to be disconnected. This arrangement is sometimes preferable although the circuit breaker 12 must carry the entire current so long as all the parallel winding sections are connected. This is not objectionable because in general the limitations of a circuit breaker are determined by its ability to interrupt a current and not by its current carrying capacity. The arrangement shown, moreover, has the advantage that the entire current may be interrupted by a single circuit breaker if desired. There is also the further advantage that an inspection of this one circuit breaker will indicate with certainty whether or not the line conductors have been entirely disconnected from the transformer.

Having described one arrangement and application of the invention, it will be obvious that various modifications may be made without departing from the invention as defined in the appended claims.

What I claim as new and desire to secure by Letters Patent of the United States is:—

1. The combination with electrical apparatus having a magnetic core, and a winding on said core formed in sections connected in parallel to an outside circuit, of means responsive to overload conditions of the apparatus for disconnecting one only of said winding sections, said winding sections being inductively related in said apparatus in such manner that the impedance of the apparatus is substantially increased by said disconnecting of one winding section.

2. The combination with electrical apparatus having a magnetic core, and a winding on said core formed in sections connected in parallel to an outside circuit, of means responsive to overload conditions of the apparatus for separately disconnecting said winding sections, said winding sections being inductively related in said apparatus in such manner that the impedance of the apparatus is substantially increased by the disconnecting of a winding section.

3. The combination with electrical apparatus having a magnetic core, and a winding on said core formed in sections connected in parallel to an outside circuit, of means responsive to overload conditions of the apparatus for separately disconnecting said winding sections, said disconnecting means having different time delay intervals for the different winding sections, whereby said winding sections are disconnected in predetermined succession, and said winding sections being inductively related in said apparatus in such manner that the impedance of the apparatus is substantially increased by the disconnecting of a winding section.

4. The combination with electrical apparatus having a magnetic core, and a winding on said core formed in sections connected in parallel to an outside circuit, of a circuit breaker responsive to overload conditions of said apparatus for disconnecting one of said winding sections only, and a circuit breaker responsive to overload conditions of said apparatus for interrupting said common circuit, the latter circuit breaker having the longer time delay interval, and said winding sections being inductively related in said apparatus in such manner that the impedance of the apparatus is substantially increased by said disconnecting of one winding section.

5. A transformer comprising a magnetic core, two windings on said core, one of said windings having a plurality of parallel connected sections, said sections together having low reactance with said other winding but each section alone having high reactance with part of said other winding, and means responsive to overload conditions of said transformer for separately disconnecting said winding sections.

6. A transformer comprising a magnetic core, two windings on said core, one of said windings having a plurality of parallel connected sections, said sections together having low reactance with said other winding but each section alone having high reactance with part of said other winding, and means responsive to overload conditions of said transformer for separately disconnecting said winding sections, said disconnecting means having different time delay intervals for the different winding sections, whereby said winding sections are disconnected in predetermined succession.

In witness whereof, I have hereunto set my hand this 7th day of June 1926.

FREDERICK F. BRAND.